US010156938B2

(12) United States Patent
Kamamori

(10) Patent No.: US 10,156,938 B2
(45) Date of Patent: Dec. 18, 2018

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Yuki Kamamori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 15/237,182

(22) Filed: Aug. 15, 2016

(65) Prior Publication Data

US 2017/0052632 A1 Feb. 23, 2017

(30) Foreign Application Priority Data

Aug. 20, 2015 (WO) ................. PCT/JP2015/073332

(51) Int. Cl.
| | |
|---|---|
| G06F 3/041 | (2006.01) |
| G06F 3/044 | (2006.01) |
| G06F 3/042 | (2006.01) |
| G06F 3/0488 | (2013.01) |

(52) U.S. Cl.
CPC ............ G06F 3/0425 (2013.01); *G06F 3/041* (2013.01); *G06F 3/044* (2013.01); *G06F 3/04883* (2013.01); *G06F 2203/04101* (2013.01); *G06F 2203/04105* (2013.01)

(58) Field of Classification Search
CPC ...... G06F 3/0416; G06F 3/0414; G06F 3/044; G06F 2203/04208
See application file for complete search history.

(56) References Cited

U.S. PATENT DOCUMENTS

2005/0110769 A1* 5/2005 DaCosta ............... G06F 3/0418
345/173
2006/0132457 A1* 6/2006 Rimas-Ribikauskas ....................
G06F 3/04842
345/173

(Continued)

FOREIGN PATENT DOCUMENTS

| JP | 4052498 | 2/2008 |
| JP | 2013-506905 | 2/2013 |
| JP | 2013-254331 | 12/2013 |

*Primary Examiner* — Ariel Balaoing
(74) *Attorney, Agent, or Firm* — Canon U.S.A., Inc. IP Division

(57) ABSTRACT

An information processing apparatus includes a distance obtaining unit which obtains information indicating a degree of proximity between an operation object and a predetermined surface, a reference determination unit which determines a first reference value associated with the degree of proximity based on transition of the degree of proximity during one touch input to the predetermined surface by the operation object after a start of the one touch input is recognized, a condition determination unit which determines, during the one touch input, a first condition associated with the degree of proximity for recognizing an end of the touch input based on the determined first reference value, and a recognition unit which recognizes an end of the touch input when the degree of proximity indicated by the information obtained by the distance obtaining unit satisfies the first condition determined by the condition determination unit.

16 Claims, 9 Drawing Sheets

(56) References Cited

U.S. PATENT DOCUMENTS

| | | | | |
|---|---|---|---|---|
| 2006/0161870 A1* | 7/2006 | Hotelling | ............ | G06F 3/0485 715/863 |
| 2009/0237372 A1* | 9/2009 | Kim | ........................ | G06F 3/044 345/173 |
| 2009/0303199 A1* | 12/2009 | Cho | .................... | G06F 3/04845 345/173 |
| 2010/0321289 A1* | 12/2010 | Kim | ...................... | G06F 1/1626 345/156 |
| 2011/0050629 A1* | 3/2011 | Homma | ................ | G06F 3/0414 345/174 |
| 2012/0327031 A1* | 12/2012 | Fujioka | ................. | G06F 3/0428 345/175 |

* cited by examiner

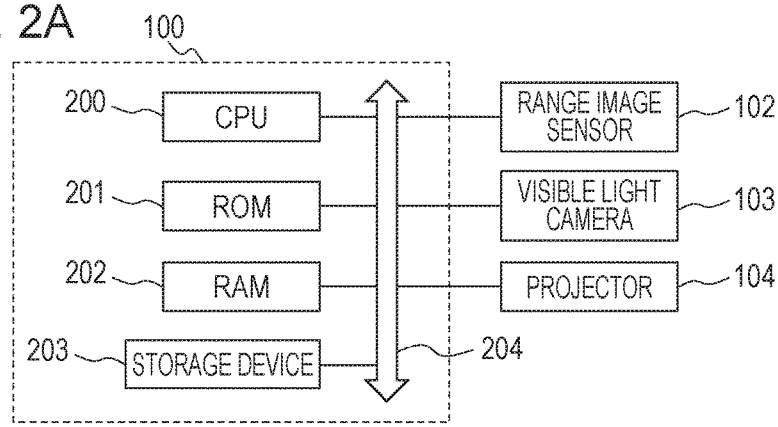
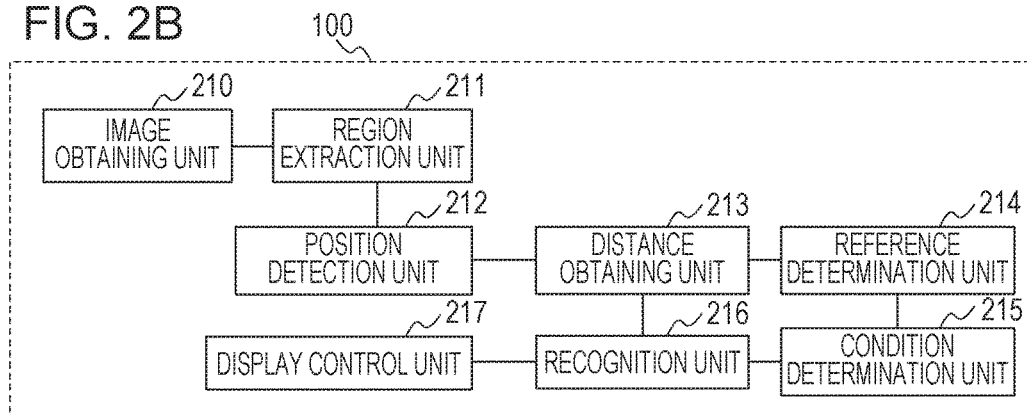
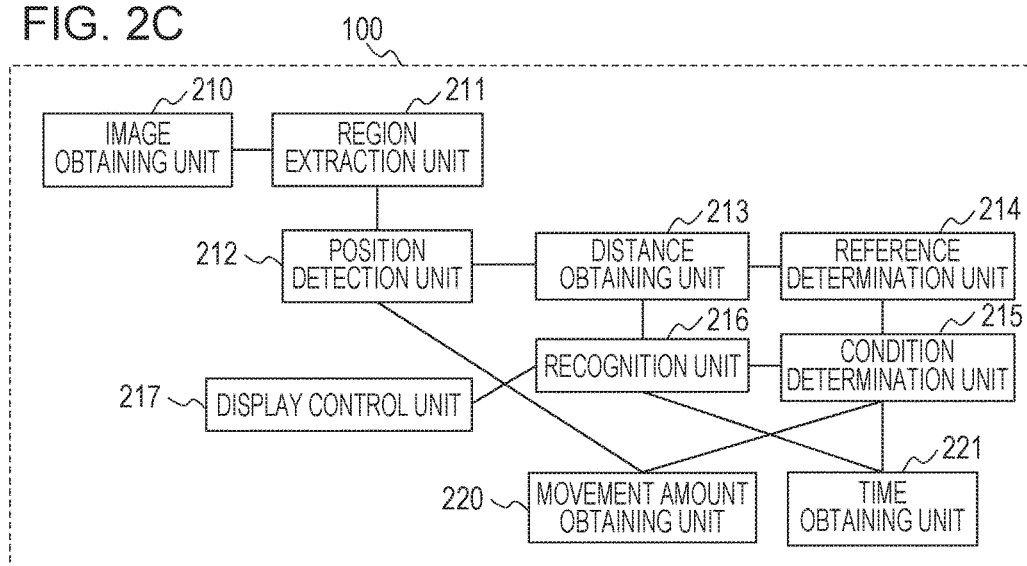

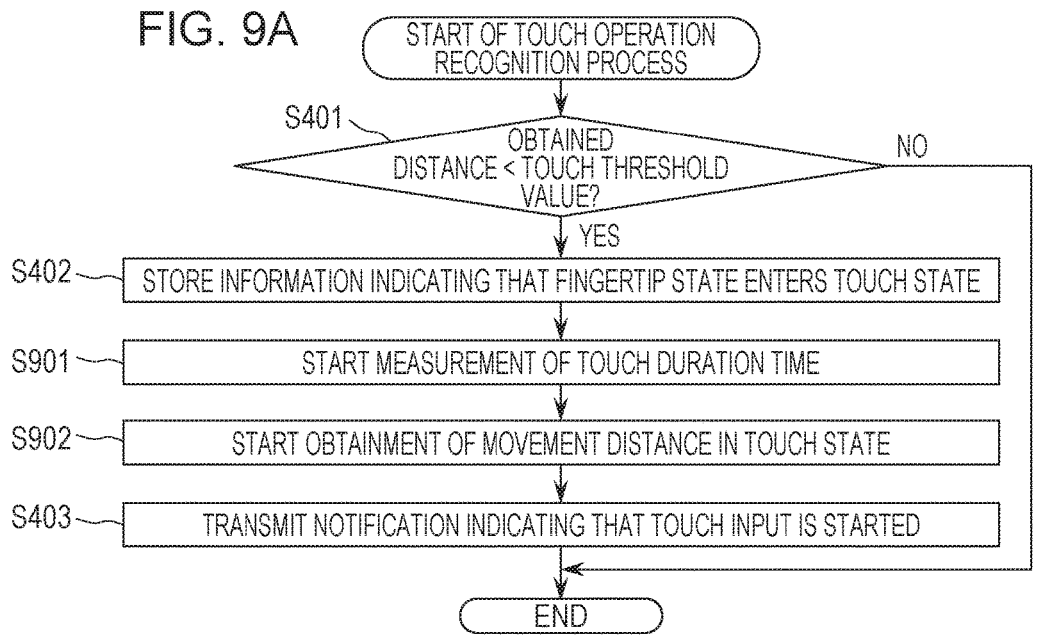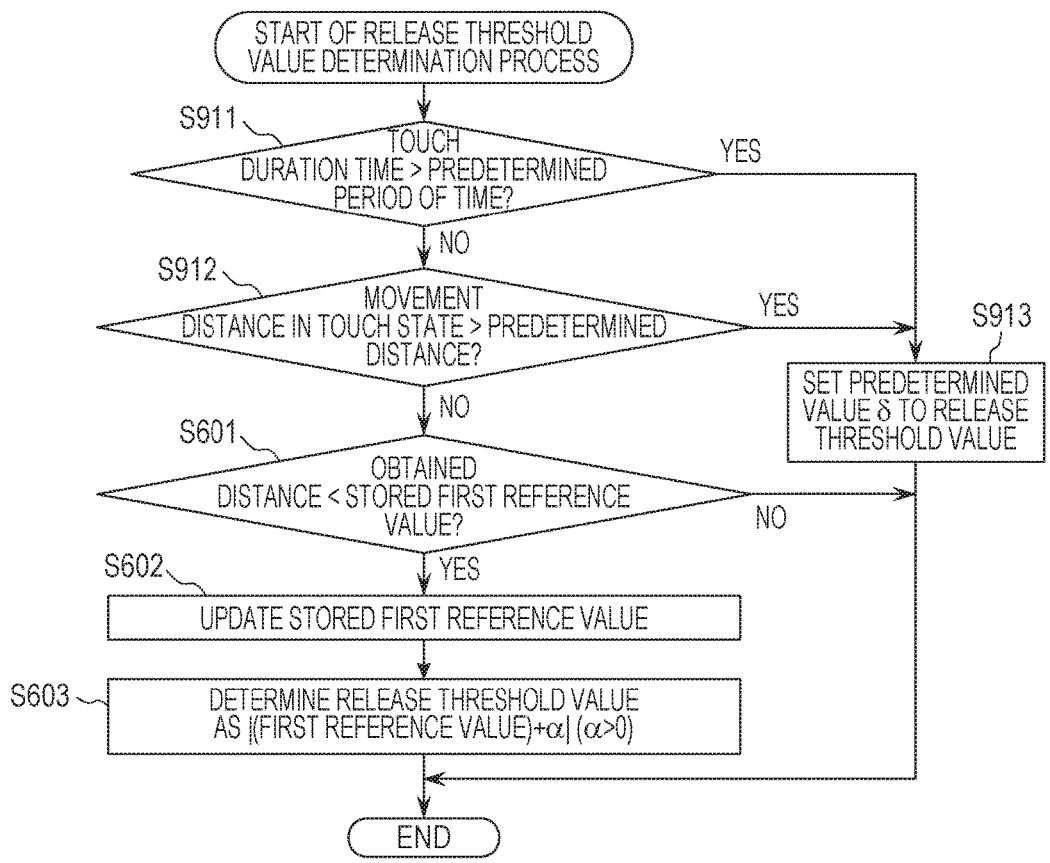

US 10,156,938 B2

INFORMATION PROCESSING APPARATUS, METHOD FOR CONTROLLING THE SAME, AND STORAGE MEDIUM

FIELD OF THE INVENTION

The present disclosure generally relates to information processing and, more particularly, to an information processing apparatus, a method for controlling the same, a storage medium, and a technique of detecting a touch input performed by an operator.

DESCRIPTION OF THE RELATED ART

In recent years, in environments of augmented reality (AR) and mixed reality (MR), a virtual touch target surface which does not physically exist is touched in some cases. Furthermore, a user interface (UI) may be projected on an arbitrary operation plane, such as a wall or a desk, by projection and the projected UI may be touched. In such a situation, it is determined, based on a degree of proximity between a portion of a certain operation object (such as a fingertip of an operator) and a target surface, whether the target surface and the portion of the certain operation object are in contact with each other using an imaging unit, such as a stereo camera or an infrared camera, which is capable of obtaining a range image for obtaining range information in many cases. Specifically, a predetermined threshold value is set to the distance between the target surface and the fingertip of the operator, and it is determined that the fingertip has touched the target surface when the fingertip approaches the target surface to an extent that the distance smaller than the threshold value. Hereinafter, a state in which the fingertip and the target surface become in contact with each other from a non-contact state is referred to as "touch", and a state in which the contact state is changed to the non-contact state is referred to as "release".

In a case where a process of obtaining a degree of proximity between the operation object and the target surface is performed in accordance with information detected by a sensor so that range information is obtained from a range image, for example, it is difficult to remove an error caused by accuracy and an environment of the sensor. It may be difficult to set an appropriate threshold value taking the error into consideration for detection of a touch and a release using a threshold value determination for obtaining a degree of proximity between the operation plane and the operation object, such as a distance between the operation object and the target surface.

According to Japanese Patent No. 4052498, reverse of a direction of a movement of an operation object which has touched a target surface is set as a condition for recognizing a release instead of a case where a threshold value is exceeded.

In an environment in which an error is generated in a position detection of an operation object, even if a user fixes the operation object, deviation of positional information may be detected. Depending on a degree of the detected deviation, a result indicating reverse of a motion of the operation object which is not desired by the user may be obtained. Such a case is not taken into consideration in the technique of Japanese Patent No. 4052498.

The present disclosure provides reduction of false recognition of an end of a touch input caused when an error is included in a result of detection of a degree of proximity between the operation object and the target surface.

SUMMARY OF INVENTION

According to an aspect of the present disclosure, an information processing apparatus includes an obtaining unit configured to obtain information indicating a degree of proximity between an operation object and a predetermined surface, a reference determination unit configured to determine a first reference value associated with the degree of proximity based on transition of the degree of proximity during one touch input to the predetermined surface by the operation object after a start of the one touch input is recognized, a condition determination unit configured to determine, during the one touch input, a first condition associated with the degree of proximity for recognizing an end of the touch input based on the first reference value specified by the reference determination unit, a recognition unit configured to recognize an end of the one touch input when the degree of proximity indicated by the information obtained by the obtaining unit satisfies the first condition determined by the condition determination unit.

Further features of the present disclosure will become apparent from the following description of exemplary embodiments with reference to the attached drawings.

BRIEF DESCRIPTION OF DRAWINGS

FIG. 2A is a block diagram illustrating a hardware configuration of the information processing apparatus according to the first embodiment, FIG. 2B is a block diagram illustrating a functional configuration according to the first embodiment, and FIG. 2C is a block diagram illustrating a functional configuration according to the modification.

FIG. 43 is a flowchart illustrating a flow of the touch operation recognition process according to the first embodiment.

FIG. 9A is a flowchart illustrating a flow of a touch operation recognition process according to a modification, and FIG. 9B is a flowchart illustrating a flow of a release threshold value determination process according to the modification.

DESCRIPTION OF EMBODIMENTS

Figure 1:
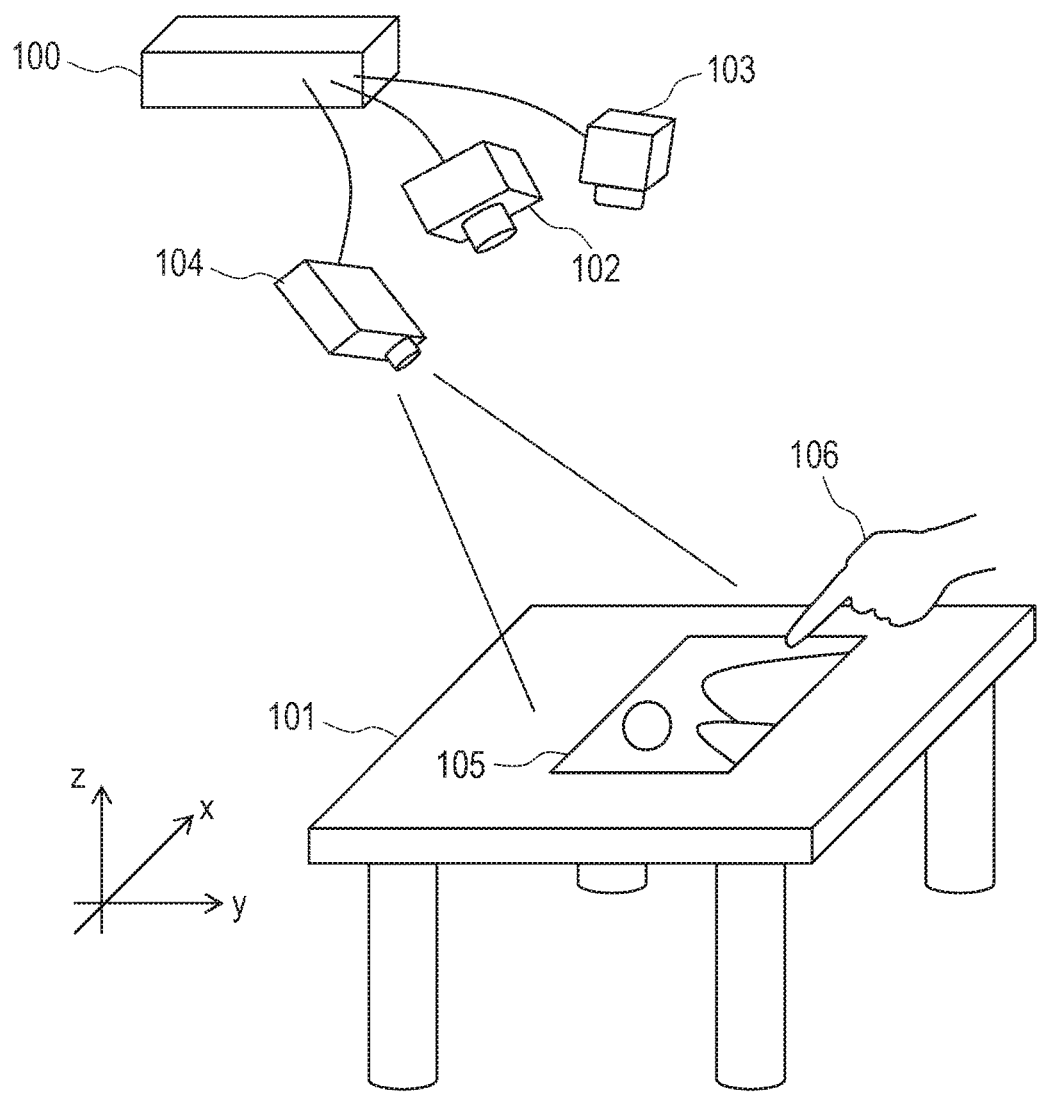
FIG. 1 is a diagram illustrating appearance of a system utilizing an information processing apparatus according to a first embodiment.

Hereinafter, information processing according to an embodiment of the present disclosure will be described in detail with reference to the accompanying drawings. Note that configurations described in the embodiment are merely examples, and the scope of the present disclosure is not limited to the configurations.

In general, the term "touch", as used herein, generally refers to an operation of starting a touch input to an item projected on a table plane by bringing a fingertip into contact with a display region of the item or by causing a fingertip to approach the display region of the item. Furthermore, the term "release", as used herein, generally refers to an operation of terminating the touch input to the item by releasing the fingertip which was in contact with the item or which approached the item from the item after the touch operation. A large number of information processing apparatuses which employ touch operation(s) may recognize various touch operations, such as tapping, moving, and flicking, based on a position, a movement, a speed, and so on of a fingertip in a period between the touch to the release. For example, an input of a flow in which a fingertip touches a target surface, and thereafter, the fingertip is released within a negligible movement in a direction along the target surface is referred to as a "tap operation" which is likely to be recognized as an instruction for selecting an item being displayed. In this embodiment, an information processing apparatus which recognizes a "touch" and a "release" as solo operations referred to as a "touch operation" and a "release operation" and which performs feedback to a user is described as an example. For example, a color of an item being touched is changed when a touch operation is recognized. Furthermore, a touched item is enlarged when a release operation is recognized. In this embodiment, a state of an operation object in a period between a touch to a release is referred to as a "touch input".

Mobile apparatuses, such as smartphones and tablet personal computers (PCs), directly detect a touch of a fingertip of an operator on a display screen by a touch sensor disposed in the display screen so as to recognize a touch and a release in many cases. In this way, in a system which directly determines whether a certain touch plane has been touched or has not been touched, a touch or a release is barely recognized at a timing which is considerably different from intention of a user who performs a touch operation. On the other hand, in a case where a distance between an operation object and a target surface is obtained and a touch and a release are detected in accordance with a comparison between the distance and a threshold value, the distance obtained as a result of a measurement may exceed the threshold value at a timing which is not desired by the user. In general, it is likely that a sufficiently large threshold value (hereinafter referred to as a "touch threshold value") of a distance from a touch target surface for detecting a touch is set to prevent omission of recognition of a touch due to a detection error. Furthermore, in general, a threshold value of a distance from the touch target surface for detecting a release (hereinafter referred to as a "release threshold value") may be the same as the touch threshold value or larger than the touch threshold value. A large release threshold value prevents interruption of recognition of an operation caused by an error of detection generated during a touch input since a release is not recognized until the operation object is sufficiently separated from the target surface. However, if a large touch threshold value and a large release threshold value are set, a touch and a release are not recognized unless the user performs a touch operation by an unnatural exaggerated action. As a result, operability is degraded.

Accordingly, in this embodiment, in a case where a touch is recognized by a threshold process associated with a predetermined touch threshold value, a release threshold value is dynamically determined in accordance with transition of a degree of proximity between the operation object and the touch target surface during a touch input after the recognition of the touch. Specifically, using a degree of proximity between the operation object and the touch target surface at a time when the operation object most closely approaches to the touch target surface in the touch input as a reference, a release is recognized when the operation object is moved far from the touch target surface from the reference by a predetermined threshold value. Furthermore, in this embodiment, the touch threshold value for restart of a touch input after the release is once recognized is dynamically determined in accordance with transition of a degree of proximity between the operation object and the touch target surface obtained after the release is recognized.

Hereinafter, a case where an operator performs a touch input with a finger of one hand for selecting an item projected on a table plane of a tabletop interface system will be described as a first embodiment. Note that, although a finger of one hand of the user is described as the operation object used by the user for input of an operation, for example, hereinafter, a stylus, a robot arm, or like objects may be used as the operation object.

System Appearance

FIG. 1 is a diagram illustrating appearance of the tabletop interface system including an information processing apparatus 100 according to this embodiment. Coordinate axes which define information on a position in a three-dimensional (3D) space are also illustrated. A target surface 101 is a table portion of the table top interface, and the user may input a touch operation by touching the target surface 101. In this embodiment, a range image sensor 102 is disposed over the target surface 101 such that the range image sensor 102 looks down at the target surface 101. A range image indicates an image in which information on a distance from a reference position (such as a center of a lens of an imaging unit used for imaging) to a surface of an object which has been subjected to imaging is reflected to values of pixels. A distance from the range image sensor 102 to the target surface 101 or a surface of an object disposed on the target surface 101 is reflected to the pixel values of the range image captured by the range image sensor 102 in this embodiment. The captured range image is input to the information processing apparatus 100 as an input image. The information processing apparatus 100 analyzes the input image so as to obtain a 3D position of a user's hand 106 and recognizes an input operation. Accordingly, the user may input a space gesture operation by moving a certain object, such as a hand, within a range which may be captured by the range image sensor 102 in a space between the target surface 101 and the range image sensor 102. In this embodiment, a pattern irradiation sensor using infrared light or a time-of-flight (TOF) sensor is used.

Furthermore, in this embodiment, a visible light camera 103 is also disposed in a position in which the visible light camera 103 looks down at the target surface 101. The information processing apparatus 100 may control the visible light camera 103 so that the visible light camera 103 functions as a document camera which captures an image of an object mounted on the target surface 101 so as to obtain the read image of the object. The information processing apparatus 100 detects an object in a space over the target surface 101 in accordance with the visible light image obtained by the visible light camera 103 and the range image obtained by the range image sensor 102 and further distinguishes the object. Examples of the object include a user's hand, a document, such as a paper medium or a book, and other solid objects.

A projector 104 projects an image on an upper surface of the target surface 101. In this system, the user performs an operation by a touch or a space gesture relative to an item 105 included in the projected image. As described above, the range image obtained by the range image sensor 102 is used for detection of the hand 106 and recognition of an operation in this embodiment. The use of the range image is advantageous in that influence of a change of a color of a user's hand due to projection light is negligible. As a display device of this embodiment, instead of the projector 104, a liquid crystal display may be used as the target surface 101. In this case, a hand may be detected without influence of projection light by using a method for detecting a human hand in an image by detecting a skin color region in a visible light image, for example.

The range image sensor 102 and the visible light camera 103 do not need to be disposed over the target surface 101 as long as an image is obtained in a state in which the target surface 101 is viewed from above. An image having a view filed in which the target surface 101 is viewed from above may be obtained even if an image of a mirror disposed over the target surface 101 is captured, for example. Similarly, although the projector 104 performs projection on the target surface 101 such that the projector 104 diagonally looks down at the target surface 101, projection light projected in a different direction may be reflected by a mirror to the target surface 101.

In this embodiment, x, y, and z axes illustrated in FIG. 1 are defined in a 3D space on the target surface 101 for expressions of positional information. Here, an xy plane is parallel to an upper surface of the table, and a positive direction of a z axis corresponds to an upward direction which is orthogonal to the table upper surface. Note that the z axis corresponds to a height direction in the world coordinate system in this embodiment. However, this embodiment is applicable to a system in which a plane which is not horizontal, such as a white board or a wall surface, is used as the target surface 101.

Configuration of Apparatus

FIG. 2A is a diagram illustrating a hardware configuration of the tabletop interface including the information processing apparatus 100 according to this embodiment. A central processing unit (CPU) 200, which may include one or more processors and one or more memories, uses a random access memory (RAM) 202 as a work memory, and executes an OS and programs stored in a read only memory (ROM) 201 and a storage device 203 so as to perform calculations and logical determinations of various processes and control configurations connected to a system bus 204. Processes executed by the CPU 200 include a touch operation recognition process and a release operation recognition process which will be described later. The storage device 203 is a hard disk drive or an external storage device, for example, connected through various interfaces, and stores programs and various data associated with the operation recognition processes of this embodiment. The range image sensor 102 captures a range image of a space including a table which displays items and a user's hand which operates the items and outputs the captured range image to the system bus 204 under control of the CPU 200. Although a sensor utilizing infrared light which is less affected by environment light or display on a table plane is described as an example of a method for obtaining a range image in this embodiment, a parallax method or a method utilizing reflection time of infrared light may be employed as usage. The projector 104 projects an image item which is an operation target on the table under control of the CPU 200. As used herein, the term "unit" generally refers to any combination of hardware, firmware, software or other component, such as circuitry, that is used to effectuate a purpose.

Note that, in the use example in FIG. 1, the visible light camera 103, the range image sensor 102, and the projector 104 are external apparatuses individually connected to the information processing apparatus 100 through input/output interfaces and constitute an information processing system with the information processing apparatus 100. Note that these devices may be integrally formed with the information processing apparatus 100.

FIG. 2B is a block diagram illustrating a functional configuration of the information processing apparatus 100 of this embodiment. Various function units are realized when the CPU 200 develops, in the RAM 202, programs stored in the ROM 201 and executes processes in accordance with flowcharts described below. Furthermore, in a case where hardware is configured as a substitute of a software process using the CPU 200, for example, calculation units and circuits corresponding to processes of the function units described here are configured.

An image obtaining unit 210 obtains a range image captured by the range image sensor 102 every fixed time as an input image and stores the range image in the RAM 202. Although an object which is obtained by the image obtaining unit 210 and which is transmitted and received by the function units is actually a signal corresponding to image data, expressions "a range image is obtained" or "an input image is obtained" is simply used in this specification.

A region extraction unit 211 performs a threshold value determination and a noise reduction process based on a background differencing technique on pixels of the input image obtained by the image obtaining unit 210 so as to extract a hand region in the range image. As a background image, an input image which is obtained by capturing an image of the target surface 101 in a state in which any object does not exist on the target surface 101 is used. The hand region of the input range image includes an image of the hand of the user used as an operation object. A position detection unit 212 detects a position of a fingertip of the user's hand in accordance with contour information of the hand region extracted by the region extraction unit 211 and specifies a coordinate value.

A distance obtaining unit 213 obtains a distance between the position of the fingertip detected by the position detection unit 212 and a table upper surface which is a touch target surface as information indicating a degree of proximity. Since the input image of this embodiment has a value corresponding to a z coordinate in each pixel value, a difference between a pixel value of a pixel corresponding to a fingertip position in a background image detected by the position detection unit 212 and a pixel value of a pixel corresponding to a fingertip position in the input image corresponds to a distance between the fingertip (an upper surface) and the upper surface of the target surface 101. In this embodiment, a degree of proximity between the operation object and the touch target surface corresponds to a value of the z coordinate in the coordinate axes illustrated in FIG. 1 which indicates a height of the fingertip from the table plane. However, the degree of proximity between the operation object and the touch target surface is not limited to range information obtained based on the pixel values of the range image. For example, a change amount of an electrostatic capacitance generated by proximity between the operation object and the touch target surface, a temperature, pressure, or a change amount of a touch area may be used as the degree of proximity.

A reference determination unit 214 determines a first reference value which is a reference for determining a release threshold value in accordance with a change of a degree of proximity between the operation object and the target surface after a recognition unit 216 described below recognizes a touch. The first reference value is specified based on information obtained when the operation object most closely approaches the target surface. The degree of proximity indicates a distance between the touch target surface and the operation object (a height of the fingertip from the table) in this embodiment. Accordingly, the reference determination unit 214 determines a minimum distance (a minimum height) between the operation object and the touch target surface as the first reference value after a touch input is started. Furthermore, in this embodiment, the reference determination unit 214 determines a second reference value in accordance with a transition of a degree of proximity between the operation object and the target surface after the recognition unit 216 described below recognizes a release. The second reference value is a reference of a process of determining a touch threshold value for recognizing a touch which is input again after the release. The second reference value is specified based on information obtained when the operation object separates from the target surface farthest. In this embodiment, the reference determination unit 214 determines, as the second reference value, a maximum distance (a maximum height) between the operation object and the touch target surface in transition of the distance between the operation object and the touch target surface (a height of the fingertip from the table) after a release is recognized.

A condition determination unit 215 determines conditions for detecting a touch operation and a release operation using the reference values determined by the reference determination unit 214. In this embodiment, as a first condition for recognizing at least an end of a touch input, a release threshold value associated with a degree of proximity between the operation object and the touch target surface is determined. Thereafter, a touch threshold value is determined as a second condition for recognizing restart of the touch input. Since the distance between the touch target surface and the operation object (a height of the fingertip from the table) is used as information indicating a degree of proximity in this embodiment, the release threshold value and the touch threshold value correspond to threshold values of a distance (a height). Specifically, the release threshold value which is the first condition may be determined by adding a predetermined value to a distance determined as the first reference value. The touch threshold value which is the second condition may be determined by adding a predetermined value to a value determined as the second reference value. Note that an initial value of the touch threshold value is used if a result obtained by adding a predetermined value to the second reference value is larger than the initial value of the touch threshold value.

The recognition unit 216 recognizes a touch operation and a release operation in accordance with a comparison between the distance obtained by the distance obtaining unit 213 and the predetermined initial value of the touch threshold value or the threshold values of the first and second conditions determined by the condition determination unit 215. Specifically, the recognition unit 216 recognizes a touch when the operation object closely approaches the touch target surface from a sufficiently-far distance to a distance smaller than the touch threshold value. Furthermore, the recognition unit 216 recognizes a release when the operation object is moved away from the touch target by a distance larger than the release threshold value.

A display control unit 217 generates an image to be projected by the projector 104, which is a display unit of this embodiment, on the target surface 101 on the table using information stored in the ROM 201 or the storage device 203 and outputs the image. The output image is projected and displayed on the target surface 101 on the table by the projector 104. Examples of the image to be projected include a GUI screen at least including a plurality of items to be selected and operated. The items may be independently selected and moved, or the entire image may be selected or moved.

[Touch Operation Recognition Process]

Figure 3:
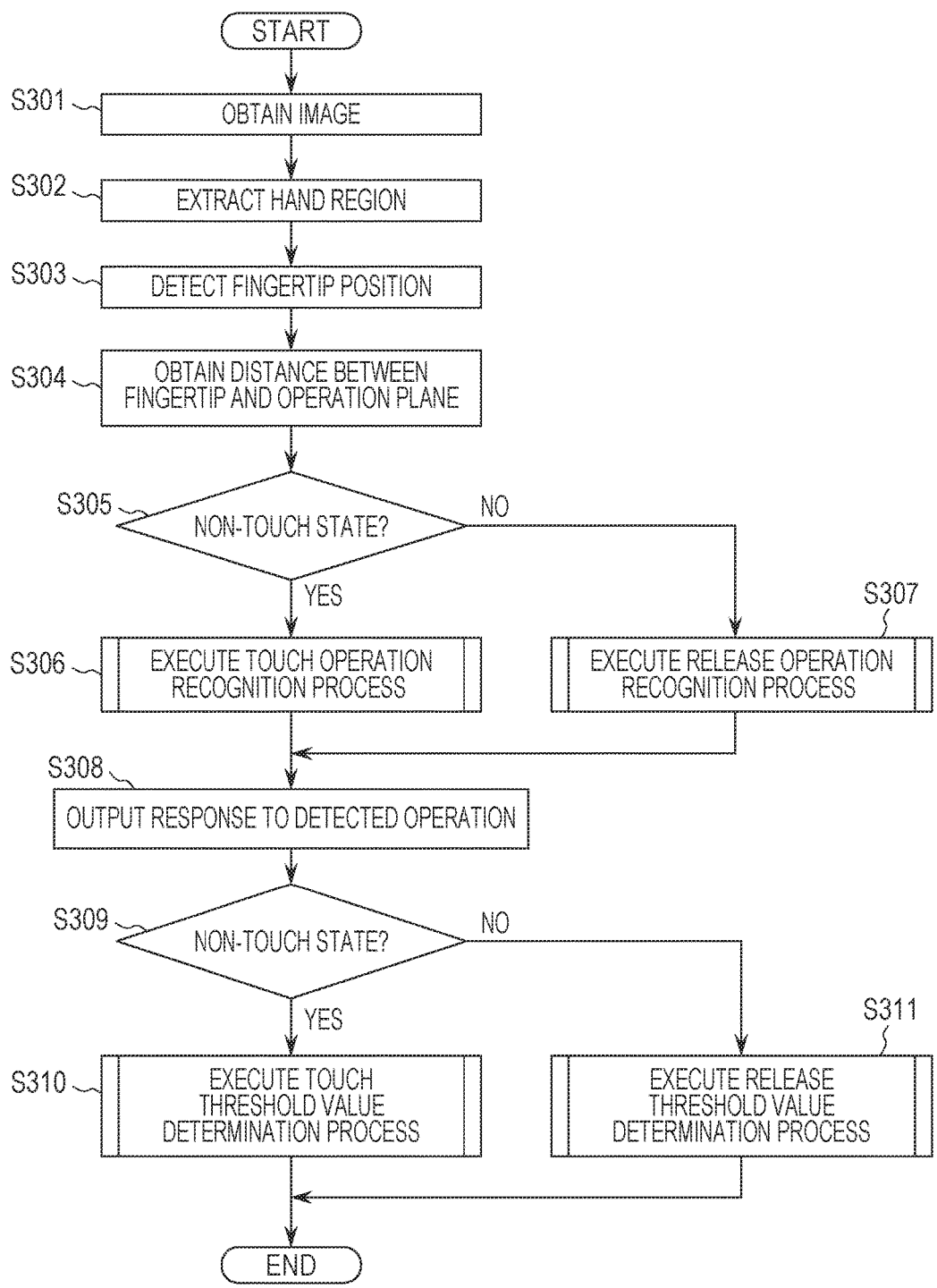
FIG. 3 is a flowchart illustrating a flow of an operation recognition process according to the first embodiment.

An operation recognition process according to the first embodiment will be described with reference to a flowchart of FIG. 3. A process in the flowchart of FIG. 3 is realized when the CPU 200 included in the function units of the information processing apparatus develops, in the RAM 202, a program recorded in the ROM 201 and executes the program. In this embodiment, the process of the flowchart of FIG. 3 is started when a range image captured by the range image sensor 102 is input to the information processing apparatus 100. Furthermore, in this embodiment, the process of the flowchart of FIG. 3 is repeatedly performed every time a range image is supplied from the range image sensor 102. Accordingly, a cycle of the process which is repeated coincides with a frame rate of an imaging video of the range image sensor 102.

In step S301, the image obtaining unit 210 obtains a range image which is obtained by the range image sensor 102 capturing an image of a space including the table on which the image is projected and the user's hand as an input image. Pixels of the obtained range image have values corresponding to a distance between the range image sensor 102 to an object. In this embodiment, coordinate transformation based on a lens feature of the range image sensor 102 and the relative positional relationship between the range image sensor 102 and the target surface 101 is performed on positions and the values of the pixels included in the input image. By this, information on the pixels included in the input image may be mapped to a 3D coordinate system in the real world defined on the target surface 101 and used as 3D positional information.

In step S302, the region extraction unit 211 scans the pixels of the range image so as to extract a hand region including an image of the user's hand in the range image. In this embodiment, a difference between the range image including the input user's hand and a background range image which is obtained in advance (a range image obtained by capturing only an image of the table) is obtained for each pixel and pixels having the difference larger than the threshold value are extracted as a hand region. Specifically, a region including a number of pixels in which heights from the table upper surface are equal to or larger than a threshold value is determined as a region including an image of the hand positioned over the table. This method is based on the background differencing technique. Furthermore, the hand region is corrected by performing an expansion and contraction process on the extracted region so as to remove little noise caused by an error of the range image sensor. Note that a pixel group which satisfies a condition in which a distance from the range image sensor 102 indicated by a pixel value is smaller than a distance represented by a predetermined threshold value may be extracted as a hand region. In this case, a range image to be obtained by capturing only an image of the table which is used as a background image is not required to be obtained in advance.

In step S303, the position detection unit 212 searches for a position corresponding to the fingertip in accordance with a shape of the hand region extracted in step S302 and detects a 3D coordinate of the position. In this embodiment, contour points of the hand region are extracted first, and angles of vectors defined by the individual contour points and their adjacent contour points are calculated. Thereafter, contour points corresponding to inter-vector angles smaller than a threshold value are extracted as candidate points, and a position in which the plurality of candidate points of the fingertip position are concentrated is specified as a position of the fingertip. Specifically, a tip of a portion indicating a projection portion in which a contour is comparatively thin is specified as the fingertip position. A 3D coordinate of the fingertip in the real world coordinate system may be calculated based on the specified fingertip position, the pixel values of the range image, and a coordinate transformation parameter for transformation into the real world coordinate system. Note that the method for detecting a fingertip position is not limited to this, and circular template matching or a method for narrowing a position using restriction based on a hand structure may be employed.

In step S304, the distance obtaining unit 213 obtains a distance between the fingertip detected in step S303 and the touch target surface as information indicating a degree of proximity. In this embodiment, the distance between the fingertip and the touch target surface is calculated as a z coordinate defined on the table.

In step S305, the recognition unit 216 determines whether a non-touch state has been entered. In this embodiment, two states, that is, a touch state and a non-touch state are defined. Then a result of a determination as to whether the operation object is in the touch state or the non-touch state is obtained for each frame. In step S305, it is determined whether a touch input is being performed in a current frame by referring to a result of a determination as to whether the operation object has entered the touch state or the non-touch state in a preceding frame.

The touch state indicates a state in which the distance between the operation object and the touch target surface is smaller than the touch threshold value (including both of the touch threshold value defined in advance as the initial value and the touch threshold value determined by the condition determination unit 215 as the second condition). The non-touch state indicates a state in which the distance between the operation object and the touch target surface exceeds the release threshold value when the operation object in the touch state is moved away from the touch target surface. However, the initial state in which a touch has not been recognized since the information processing apparatus 100 is activated is included in the non-touch state. Transition from the non-touch state to the touch state corresponds to recognition of a touch. Similarly, transition from the touch state to the non-touch state corresponds to recognition of a release. In this embodiment, it is determined that a touch input is being performed for a period in which the operation object is in the touch state irrespective of whether the operation object is physically in contact with the touch target surface. When the non-touch state is entered, it is determined that the touch input is terminated. By this, even when an arbitrary plane which does not have a touch sensor function is the target surface in the information processing apparatus 100, a so-called touch operation may be recognized similarly to an apparatus including a touch sensor.

The recognition unit 216 stores information on a current state in the RAM 202 every time state transition occurs. Accordingly, the recognition unit 216 performs the determination in step S305 with reference to the information stored in the RAM 202 as a result of a process of a preceding frame. When the non-touch state is currently detected (Yes in step S305), the process proceeds to step S306. When the non-touch state is not currently detected (No in step S305), the process proceeds to step S307. The case where the non-touch state is not detected is a case where the touch state is detected.

Figure 4A:
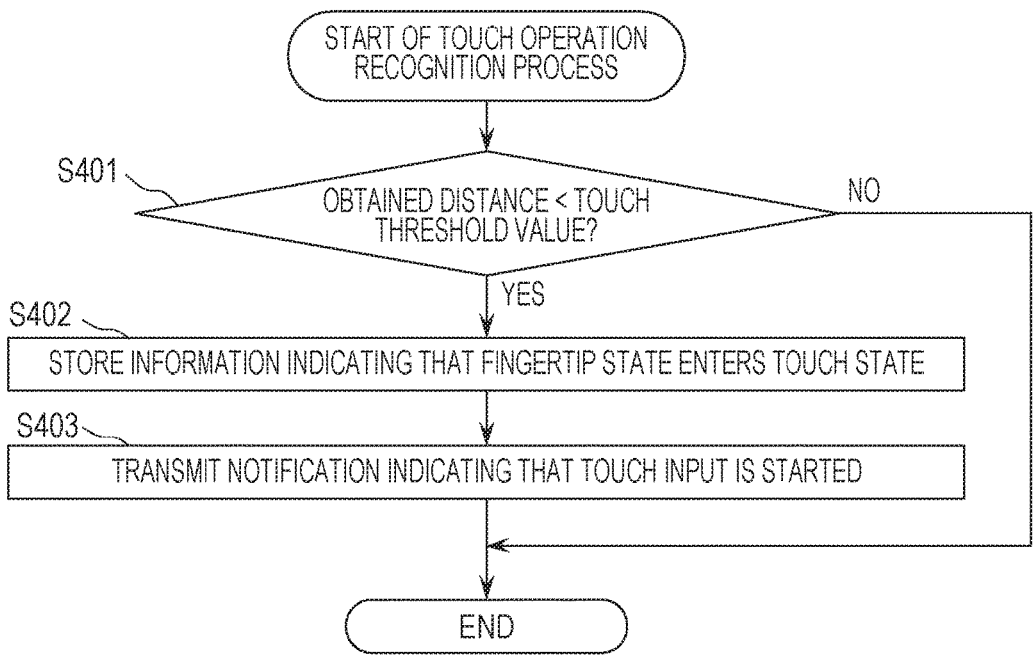
FIG. 4A is a flowchart illustrating a flow of a touch operation recognition process according to the first embodiment.

In step S306, a touch operation recognition process is executed. In the touch operation recognition process, the touch operation is recognized in accordance with the magnitude relationship between a distance between the operation object currently in the non-touch state and the touch target surface and the touch threshold value. Here, a flowchart of FIG. 4A illustrates the process executed by the recognition unit 216 in step S306. First, in step S401, the recognition unit 216 determines whether the distance obtained in step S304 is smaller than the touch threshold value. The touch threshold value used in this comparison corresponds to the touch threshold value stored in the information processing apparatus 100 as the initial value or the touch threshold value determined as the second condition in step S310 described below. When it is determined that the obtained distance is smaller than the touch threshold value (Yes in step S401), the process proceeds to step S402. When it is not determined that the obtained distance is smaller than the touch threshold value (No in step S401), the touch operation is not recognized and the process returns to the flowchart of FIG. 3.

In step S402, the recognition unit 216 stores information indicating that the state of the fingertip shifts from the non-touch state to the touch state in the RAM 202. In step S403, the recognition unit 216 notifies the function units which perform the following processing, such as the condition determination unit 215 and the display control unit 217), of a start of a touch input.

Figure 4B:
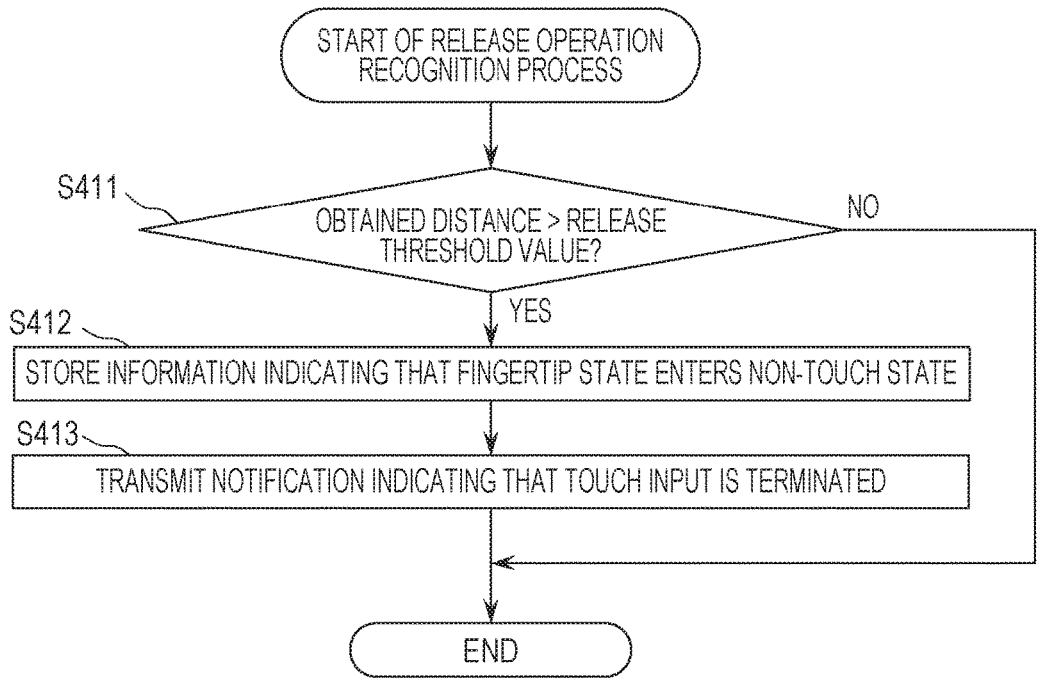

Referring back to the flowchart of FIG. 3, a release operation recognition process is executed in step S307. In the release operation recognition process, the release operation is detected in accordance with the magnitude relationship between a distance between the operation object being in the touch state and the touch target surface and the release threshold value. Here, a flowchart of FIG. 4B illustrates the process executed by the recognition unit 216 in step S307. First, in step S411, the recognition unit 216 determines whether the distance obtained in step S304 is larger than the release threshold value. The release threshold value used for the comparison here is determined in step S311 below as the first condition. When it is determined that the obtained distance is larger than the release threshold value (Yes in step S411), the process proceeds to step S412. When it is not determined that the obtained distance is larger than the release threshold value (No in step S411), the release operation is not recognized and the process returns to the flowchart of FIG. 3.

In step S412, the recognition unit 216 stores information indicating that the state of the fingertip shifts from the touch state to the non-touch state in the RAM 202. Here, the recognition unit 216 stores a current time point in the RAM 202 as a time point when the release operation is finally recognized. In step S413, the recognition unit 216 notifies the function units which perform the following processing, such as the condition determination unit 215 and the display control unit 217, of an end of the touch input.

Referring back to the flowchart of FIG. 3, in step S308, the display control unit 217 controls output to the projector 104 serving as a display unit in accordance with a result of the recognition of the recognition unit 216. In a case where a touch operation is recognized, for example, a color of a portion of a displayed image is changed in accordance with the position of the fingertip detected in step S303. Furthermore, in a case where the release operation is recognized, a portion of a displayed image is enlarged in accordance with the position of the fingertip. However, these operations are merely examples.

In step S309, the condition determination unit 215 determines whether the fingertip is currently in a non-touch state with reference to the information indicating the state of the fingertip stored in the RAM 202. Since the determination performed in step S309 is based on results of the touch operation recognition process and the release operation recognition process performed on a current frame, it is not necessarily the case that the same result as the determination in step S305 is obtained. When the non-touch state is currently detected (Yes in step S309), the process proceeds to step S310. When the non-touch state is not currently detected (No in step S309), the process proceeds to step S311. In step S310, a process of determining a touch threshold value to be used in a next frame process is executed. In step S311, a process of determining a release threshold value to be used in the next frame process is executed. The touch threshold value determination process in step S310 and the release threshold value determination process in step S311 will be described later.

Release Threshold Value Determination Process

Figure 5A:
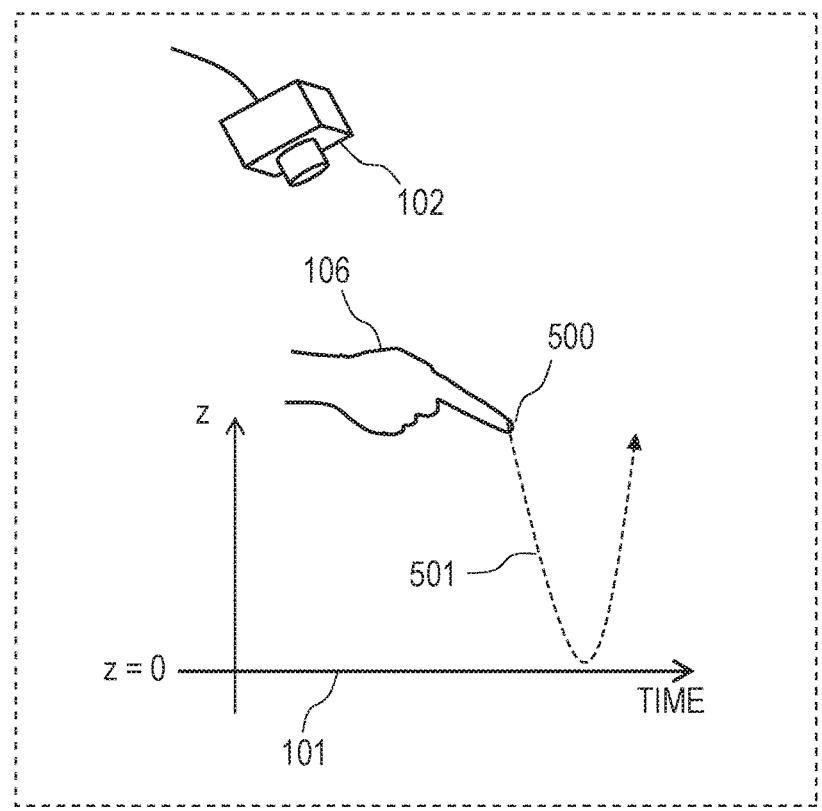
FIG. 5A is a diagram illustrating an ideal transition of a distance between a fingertip and a target surface in operation.
Figure 5B:
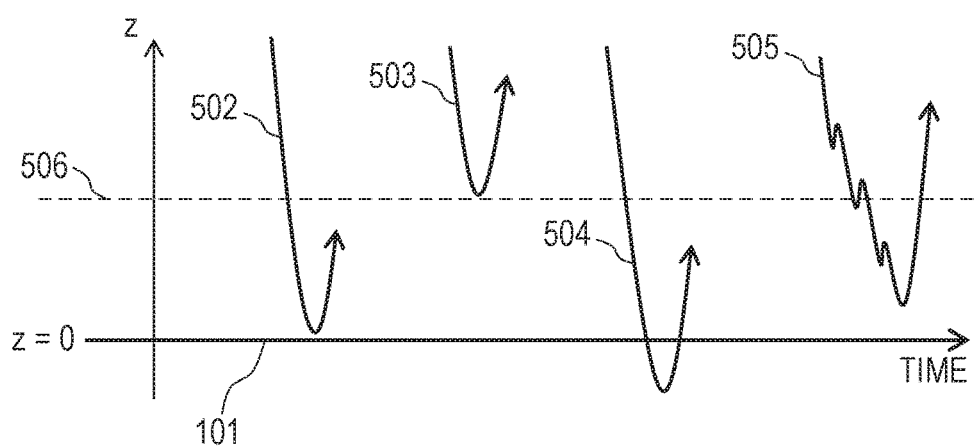
FIG. 5B is a diagram illustrating transitions of a distance between the fingertip and the target surface in operation.

Here, the release threshold value determination process executed in step S311 will be described in detail. First, FIGS. 5A and 5B include examples of transition of a degree of proximity of the fingertip, which successively inputs the touch operation and the release operation, to the touch target surface. In FIGS. 5A and 5B, axes of ordinates denote a z coordinate. In this embodiment, the z coordinate represents a degree of proximity between the operation object and the touch target surface (a plane of z=0). Furthermore, the z coordinate may correspond to a height of the fingertip from the table plane (z=0). Axes of abscissae denote time. A trajectory 501 in FIG. 5A indicates an ideal trajectory of a fingertip 500 obtained in a case where the user performs a touch operation by bringing the fingertip 500 of an index finger of the hand 106 in contact with the target surface 101 and performs a release operation (an input of the release operation corresponds to a tap operation described above) immediately after the touch operation. In a case of the ideal trajectory 501, a value of the z coordinate is uniformly reduced with time and uniformly increased after a peak.

However, in a case where various users individually perform natural tap operations, obtained trajectories of fingertip positions may not be ideal. As illustrated in FIG. 5B, various trajectories are obtained in practice due to differences among individuals and trial differences of motions of user's hands or ranging accuracy of the sensor. For example, a trajectory 502 is obtained when the fingertip 500 is not sufficiently separated after the touch operation. A trajectory 503 is obtained when the fingertip is not sufficiently moved close to the target surface. A trajectory 504 is obtained when z is detected as a minus value. A trajectory 505 is obtained when fine vertical motions are detected as a result of shifts of values. To address the variation of the trajectories, a fixed z coordinate indicated by a dotted line 506, for example, is used as the release threshold value. In this case, a touch operation may not be detected in the first place, a release operation may not be recognized even if a touch operation is recognized, an error may be detected, and a touch operation may be detected a plurality of times. In this embodiment, the release threshold value used to recognize the release operation is not fixed and is dynamically determined in accordance with transition of a degree of proximity between the fingertip and the target surface after a touch input is started so that false detection of an operation of a touch input which has a trajectory which is not ideal as illustrated in FIG. 5B is reduced.

Figure 6A:
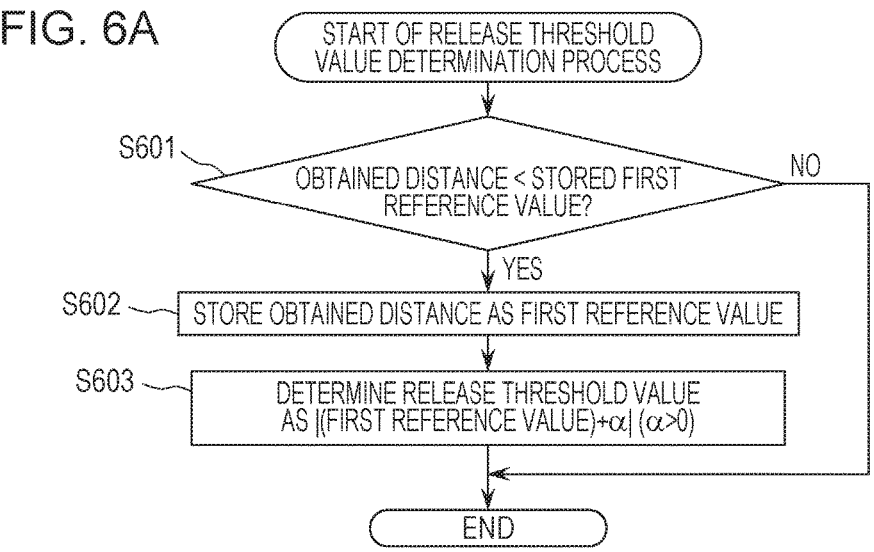
FIG. 6A is a flowchart illustrating a flow of a release threshold value determination process according to the first embodiment.

Here, a flow of the release threshold value determination process performed in step S311 will be described with reference to a flowchart of FIG. 6A. First, in step S601, the condition determination unit 215 determines whether the distance obtained in step S304 is smaller than the first reference value stored in the RAM 202. In this embodiment, a minimum value in a change of the distance between the operation object and the touch target surface performed after a touch input is started is selected as the first reference value. Note that in a case where information on the first reference value has not been stored in the RAM 202 since the process in step S311 is performed for the first time, a positive result is obtained in the determination made in step S601 at all time. When it is determined that the obtained distance is smaller than the stored first reference value (Yes in step S601), the process proceeds to step S602. In a case where it is not determined that the obtained distance is smaller than the first reference value (No in step S601), a change of the release threshold value is not required, in a current frame, and therefore, the process returns to the flowchart of FIG. 3 and the series of processes is terminated. In step S602, the condition determination unit 215 stores the distance obtained in step S304 as the first reference value. In step S603, the condition determination unit 215 determines a value obtained by adding a certain value α (α>0) to the first reference value as the release threshold value. The determined release threshold value serves as a first condition associated with a degree of proximity between the operation object and the target surface for recognition of an end of the current touch input.

Figure 7:
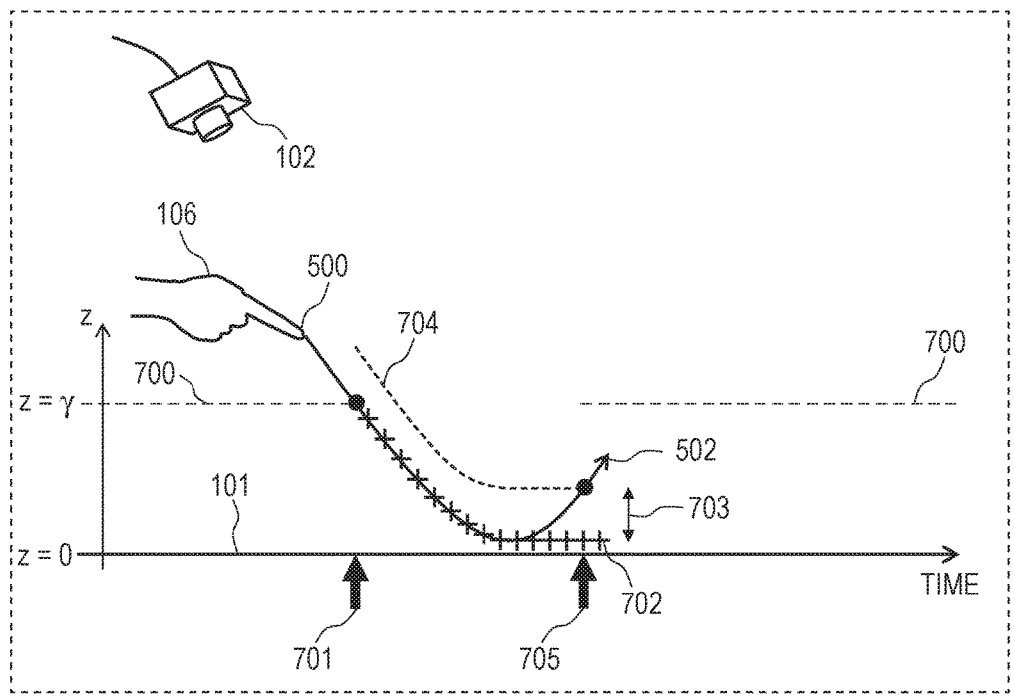
FIG. 7 is a diagram illustrating a release threshold value determined in the first embodiment.

FIG. 7 is a diagram illustrating the release threshold value determined in this embodiment. As with FIGS. 5A and 5B, an axis of ordinates denotes a z coordinate and an axis of abscissae denotes time in FIG. 7. A dotted line 700 indicates the touch threshold value given as the initial value (the touch threshold value γ>0, for example). In this embodiment, when a distance between the fingertip 500 which is in a non-touch state and the target surface 101 becomes smaller than the threshold value 700, transition of the state of the fingertip 500 to the touch state is detected. By this, it is recognized that the touch input is started. This time point is illustrated in FIG. 7 as a touch detection time point 701. Thereafter, every time a range image is newly input in accordance with a frame rate, a minimum value of the distance between the fingertip 500 and the target surface 101 (a z coordinate of the fingertip 500) is stored as the first reference value. In FIG. 7, a line 702 indicates a trajectory of the first reference value stored for each frame. Then, in each frame, a value obtained by adding a predetermined value (x (a width 703 in a z direction) to the first reference line (the line 702) is determined as the release threshold value. The determined release threshold value is used in the determination process in step S411 when the release operation recognition process is to be executed in step S307 on a next frame. In FIG. 7, a dotted line 704 indicates a trajectory of the release threshold value determined for each frame. In a case where a movement of the fingertip 500 along a trajectory 502 illustrated in FIG. 7 is detected, the release operation is recognized at a time point 705 in which a distance between the fingertip 500 and the target surface 101 (the z coordinate) exceeds the release threshold value (the dotted line 704).

Note that the predetermined value α (the width 703 in the z direction) is defined such that a magnitude of a ranging error of the sensor is tolerated so that an error detection of the release operation may be suppressed. The sensor ranging error may be changed depending on a shape of the fingertip or a feature of a surface of the fingertip, and therefore, the shape of the fingertip and the feature of the surface of the fingertip are preferably referred to when the predetermined value α is determined. In this embodiment, the release operation may be recognized at an appropriate timing since the release threshold value is dynamically set as described above. For example, to realize recognition of the touch operation even in a case where the operation object does not sufficiently approach the target surface as indicated by a trajectory 503, for example, the touch threshold value γ which is sufficiently large is required to be set. Although in this case, the release threshold value is not required to be unnecessarily large if the release threshold value determination method of this embodiment is used.

Touch Threshold Value Determination Process

Figure 6B:
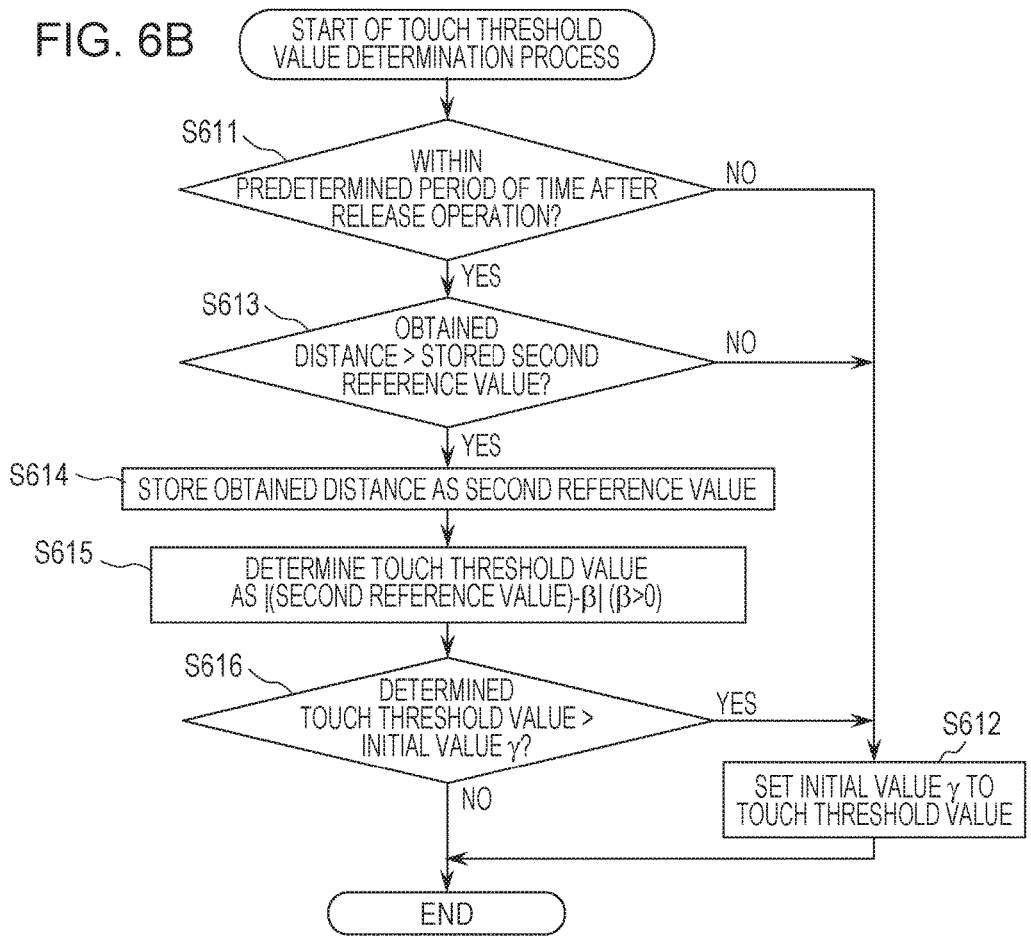
FIG. 6B is a flowchart illustrating a flow of a touch threshold value determination process according to the first embodiment.

A touch threshold value determination process executed in step S310 will now be described in detail hereinafter. FIG. 6B is a flowchart illustrating a flow of the touch threshold value determination process executed in this embodiment. In step S611, the condition determination unit 215 determines whether a current time point is within a predetermined period of time after the release operation. The process in step S611 is performed so that the threshold value is reliably returned to the initial state in a case where the user is changed, a case where an application to be executed is changed, or a case where the apparatus is abandoned in an activation state. Accordingly, the predetermined period of time determined in step S611 is sufficiently long relative to an average period of time in which one user performs continuous operation on an application. Furthermore, step S611 may be omitted depending on an environment. In this embodiment, the condition determination unit 215 performs a determination using information on a time point when the release operation is finally recognized by the RAM 202 in step S412. When it is determined that a current time is within the predetermined period of time after the release operation is performed (Yes in step S611), the process proceeds to step S613. When it is not determined that a current time is within the predetermined period of time after the release operation (No in step S611), the process proceeds to step S612. In this embodiment, when the condition determination unit 215 obtains a negative result of the determination in step S611, the information on the time point when the release operation is finally recognized by the RAM 202 in step S412 is deleted. Note that, in a case where the process in step S611 is performed in a state in which the touch operation and the release operation have not been recognized after the information processing apparatus 100 is activated (the initial state), a negative result of the determination is obtained. In step S612, the condition determination unit 215 determines the value γ (γ>0) given as the initial value of the touch threshold value as the touch threshold value. Thereafter, the process returns to the flowchart of FIG. 3 and the series of processes is terminated.

On the other hand, in step S613, the condition determination unit 215 determines whether the distance obtained in step S304 is larger than the second reference value stored in the RAM 202. A maximum value in a change of the distance between the operation object in the non-touch state and the touch target surface is selected as the second reference value in this embodiment. Note that in a case where information on the second reference value has not been stored in the RAM 202 since the process of step S613 is performed for the first time, a positive result is obtained in the determination made in step S613. When it is determined that the obtained distance is larger than the stored second reference value (Yes in step S613), the process proceeds to step S614. When it is not determined that the obtained distance is larger than the stored second reference value (No in step S613), the process proceeds to step S612. In step S614, the condition determination unit 215 stores the distance obtained in step S304 as the second reference value. In step S615, the condition determination unit 215 determines a value obtained by subtracting a certain value β (β>0) from the second reference value stored in the RAM 202 as the touch threshold value.

Furthermore, in step S616, the condition determination unit 215 determines whether the touch threshold value determined in step S615 is larger than the value γ (γ>0) given as the initial value of the touch threshold value. When it is determined that the threshold value is larger than the initial value γ (Yes in step S616) the process proceeds to step S612. When it is not determined that the threshold value is larger than the initial value γ (No in step S616), the process returns to the flowchart of FIG. 3 and the series of processes is terminated. Since the initial value γ is set as the maximum value of the touch threshold value in the process of step S616, the touch threshold value is prevented from being infinitely increased. The maximum value of the touch threshold value may not coincide with the initial value γ. Note that a value optimized in accordance with an installation environment of the information processing apparatus 100 is set to the initial value, and therefore, it is efficient that the value γ is set as the maximum value of the touch threshold value. The touch threshold determined as described above in step S310 serves as a second condition associated with a degree of proximity between the operation object and the target surface for recognition of a start of a next touch input or restart of a touch input.

Figure 8:
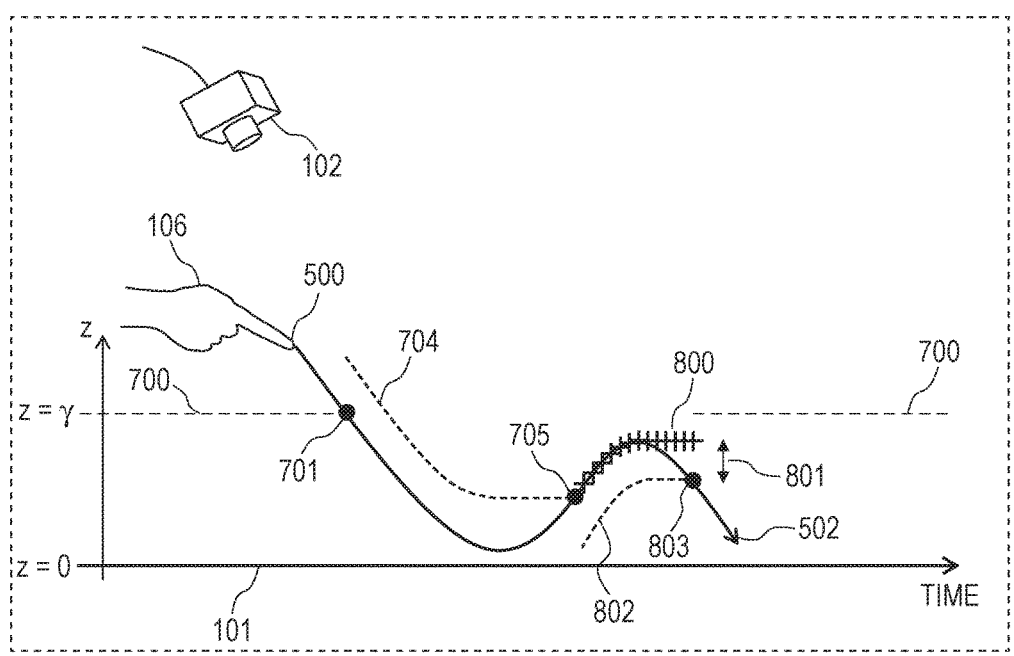
FIG. 8 is a diagram illustrating a touch threshold value determined in the first embodiment.

FIG. 8 is a diagram illustrating the touch threshold value determined in this embodiment. Note that the movement of the operation object illustrated in FIG. 7 is followed by a movement in FIG. 8. Therefore, reference numerals the same as those of FIG. 7 are assigned to components the same as those illustrated in FIG. 7, and detailed descriptions thereof are omitted. In FIG. 8, a case where a touch input is started again immediately after the touch operation and the release operation are recognized is illustrated. This situation occurs in a case where an operation of consecutively performing a tap operation twice which is referred to as a "double tap operation" is input, for example. At a time point 705 when the release operation is recognized, the distance between the fingertip 500 in the touch state and the target surface 101 exceeds the release threshold value (the dotted line 704) and the non-touch state is entered. In this embodiment, after the time point 705, every time a range image is newly input in accordance with a frame rate, a maximum value of the distance between the fingertip 500 and the target surface 101 (a z coordinate of the fingertip 500) is stored as the second reference value. In FIG. 8, a line 800 indicates a trajectory of the second reference value stored for each frame. Then, in each frame, a value obtained by subtracting a predetermined value β (a width 801 in a z direction) from the second reference value (the line 800) is determined as the touch threshold value. In FIG. 8, a dotted line 802 indicates a trajectory of the touch threshold value determined for each frame. In a case where a movement of the fingertip 500 along a trajectory 502 illustrated in FIG. 8 is detected, the touch operation is recognized at a time point 803 when the distance between the fingertip 500 and the target surface 101 (the z coordinate) becomes smaller than the touch threshold value (the dotted line 802). Here, the trajectory 502 of the fingertip 500 becomes close to the target surface 101 again before exceeding the touch threshold value 700 given as the initial value. If the user intends to repeatedly perform a touch and a release, as with a case where a double tap operation is performed, a motion of the fingertip becomes slow, and therefore, it is likely that the fingertip is not sufficiently moved upward after the release as illustrated in FIG. 8. According to this embodiment, even in a case where the fingertip closely approaches the touch target surface again in a period of time after the release operation is performed and before the touch threshold value γ given as the initial value is exceeded, the touch operation may be detected by newly determining a touch threshold value as described above.

Note that the predetermined value β is set such that a magnitude of the ranging error of the sensor is tolerated so that false detection of the touch operation may be suppressed. The sensor ranging error may be changed depending on a shape of the fingertip or a feature of a surface of the fingertip, and therefore, the shape of the fingertip and the feature of the surface of the fingertip are preferably referred to when the predetermined value β is determined.

As described above, according to this embodiment, even in the case where an error is included in an obtained value of the distance between the operation object and the target surface, a release operation may be recognized at a timing desired by the user. Furthermore, according to this embodiment, even in the case where a motion of the finger of the user is slow when the user performs the touch operation input immediately after the release operation, the touch operation is recognized with ease.

Note that the case where a touch input is accepted using a flat surface on the table as the touch target surface is described in the foregoing example. However, a direction and a shape of the touch target surface are not limited to a flat surface facing upward. For example, this embodiment is applicable to a case where a curved surface or a point is set as the touch target surface instead of the flat surface on the table. Furthermore, a virtual plane viewed through a head mount display (HMD) of an MR system may be used as the touch target surface. In particular, if the touch operation and the release operation are performed on the virtual plane, it is difficult for the user to determine whether the fingertip was in contact with the virtual plane or separated from the virtual plane by a tactile sense. Therefore, it is likely that a case where the fingertip is not sufficiently moved close to the target surface or a case where the fingertip penetrates through the defined touch target surface occurs. In such a case, by dynamically determining the release threshold value in this embodiment, it is advantageous in that the release operation desired by the user is easily recognized. Specifically, a distance between the fingertip and the virtual plane when the fingertip most closely approaches the virtual plane in an inner direction of the virtual plane is determined as the first reference value to be stored, and the release threshold value is determined by adding a predetermined value to the reference value. Similarly, even in a case where the touch target surface is a virtual plane, false recognition of the touch operation performed again after the release operation may be reduced by determining the touch threshold value in this embodiment.

Furthermore, in the foregoing example, the case where the distance between the fingertip and the target surface is obtained by the range image sensor 102 as a degree of proximity and the touch operation is detected has been described. However, a case where an electrostatic capacitance or a pressure-sensitive amount of a touch sensor, an area of contact between the fingertip and the target surface, or the like may be set as a degree of proximity for recognition of the touch operation instead of the distance. For example, in a case where the degree of proximity between the fingertip and the target surface is to be obtained from an amount of change of an electrostatic capacitance generated when the fingertip approaches the touch target surface, the larger the change amount is, the closer the distance between the fingertip and the target surface is. Accordingly, in a case where the release threshold value is to be determined, the first reference value is specified based on a change amount obtained when the electrostatic capacitance becomes maximum after a touch input is started. Furthermore, in a case where the degree of proximity between the fingertip and the target surface is obtained as a pressure-sensitive amount of the touch target surface by the fingertip, the larger a pressure amount is, the closer the distance between the fingertip and the target surface is. Accordingly, in a case where the release threshold value is to be determined, the first reference value is specified based on information obtained when the pressure is maximum after a start of a touch input. Furthermore, in a case where the degree of proximity between the fingertip and the target surface is obtained as an area of contact between the fingertip and the target surface, the larger the contact area is, the closer the distance between the fingertip and the target surface is. Accordingly, in a case where the release threshold value is to be determined, the first reference value is specified based on information obtained when the contact area is maximum after a start of a touch input. A method for specifying the second reference value in the determination of the touch threshold value is similarly performed.

Next, a configuration in which a touch threshold value and a release threshold value are appropriately determined while a fingertip moves by a certain distance in a period of time from when a touch operation is performed to when a release operation is performed will be described as a modification. After a modification, an operation of moving an operation object in parallel to a touch target surface in a period of time from when a touch operation is performed to when a release operation is performed is referred to a "move operation". If a detection error is generated in a distance between the touch target surface and the operation object when the user inputs a move operation, a release may be mistakenly detected in the move operation since a movement for exceeding a release threshold value which is not desired by the user is detected. Therefore, in this embodiment, in particular, restriction of a condition (a first condition) for recognizing a release operation is controlled taking possibility that a movement of the operation object in a touch state corresponding to the move operation into consideration.

Hereinafter, as with the first embodiment, a case where the user performs a touch input with one finger of one hand on an item projected on a table plane of a tabletop interface system will be described as an example in the modification. Note that the operation object is not limited to a hand or a finger of a user. Appearance of the interface system and a configuration of an apparatus according to the modification are the same as those of the first embodiment illustrated in FIGS. 1 and 2. Accordingly, detailed descriptions of components are omitted.

FIG. 2C is a block diagram illustrating a functional configuration of an information processing apparatus 100 according to the modification. Various function units are realized when a CPU 200 develops, in a RAM 202, programs stored in a ROM 201 and executes processes in accordance with the flowcharts of the first embodiment. Note that hardware may be used instead. Reference numerals the same as those of the function units according to the first embodiment illustrated in FIG. 2B are assigned to the function units having functions the same as those of the first embodiment. Here, portions different from the first embodiment will be described.

A movement amount obtaining unit 220 obtains a distance of a movement of a fingertip position detected by a position detection unit 212 after a time point when a non-touch state of the fingertip is changed to a touch state. A time obtaining unit 221i obtains an elapsed time from a time point, which is a reference, when the non-touch state of the fingertip is changed to the touch state obtained by a recognition unit 216 as a touch duration time. A condition determination unit 215 of the modification determines a first condition for recognizing an end of a touch input utilizing the touch duration time obtained by the time obtaining unit 221 and the movement distance of the operation object (the fingertip) after a time point when the movement amount obtaining unit 220 recognizes the obtained touch operation. Also in the modification, the first condition is defined by setting a release threshold value associated with a degree of proximity between the operation object and the touch target surface.

Operation Recognition Process

An entire flow of an operation recognition process which is a main process is executed in accordance with the flowchart of FIG. 3 also in the modification. Note that, in the modification, a touch operation recognition process in step S306 is executed in accordance with a flowchart of FIG. 9A. Furthermore, a release threshold value determination process in step S311 is executed in accordance with a flowchart of FIG. 9B. Hereinafter, portions different from the first embodiment will be described.

Touch Operation Recognition Process

FIG. 9A is a flowchart of a touch operation recognition process executed in step S306 of the modification. In the modification, in step S402, when a recognition unit 216 stores information indicating that a touch state is entered as the state of the fingertip in a RAM 202, the process proceeds to step S901. In step S901, a time obtaining unit 221 starts obtainment of a touch duration time. The touch duration time means an elapsed time after the state of the fingertip is changed from the non-touch state to the touch state. In step S902, the movement amount obtaining unit 220 starts obtainment of a movement distance of a fingertip position detected in step S303. In the modification, a coordinate of the fingertip position in a current frame is stored as a touch start position and used as a reference for calculating a shift amount between the fingertip position in the current frame and a fingertip position detected in following frames.

Release Threshold Value Determination Process

FIG. 9B is a flowchart of a release threshold value determination process executed in step S311 of the modification. First, in step S911, the time obtaining unit 221 determines whether the touch duration time in which measurement is started in the process in step S901 exceeds a predetermined period of time. When it is determined that the touch duration time exceeds the predetermined period of time (Yes in step S911), the process proceeds to step S913. On the other hand, when it is not determined that the touch duration time exceeds the predetermined period of time (No in step S911), the process proceeds to step S912. In step S912, the movement amount obtaining unit 220 obtains a distance between the touch start position stored in step S902 and the fingertip position detected in step S303 as a movement distance in the touch state and determines whether the movement distance exceeds a predetermined distance. When it is determined that the movement distance exceeds the predetermined distance (Yes in step S912), the process proceeds to step S913. On the other hand, when it is not determined that the movement distance exceeds the predetermined distance (No in step S912), the process proceeds to step S601. In step S913, the condition determination unit 215 determines a predetermined value δ as the release threshold value, and the release threshold value determination process is thus terminated. In this embodiment, the predetermined value δ is the same as the value γ given as the initial value of the touch threshold value.

Figure 10:
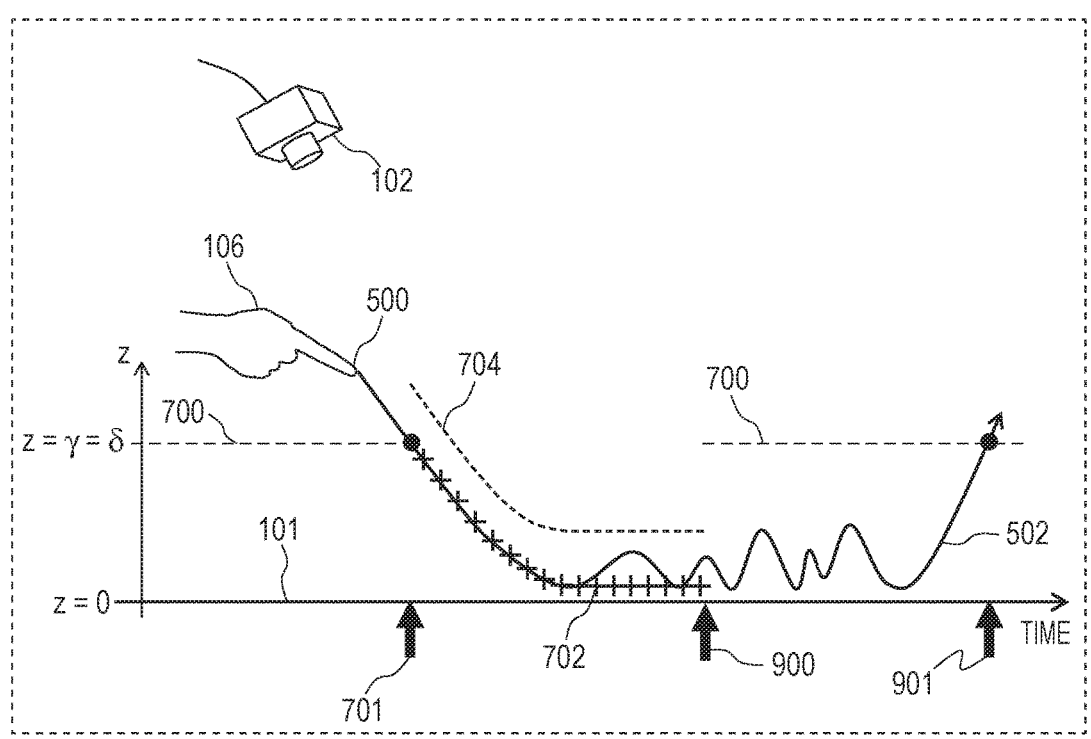
FIG. 10 is a diagram illustrating a release threshold value determined in the modification.

FIG. 10 is a diagram illustrating the release threshold value determined in the modification. As with FIGS. 5 and 7, an axis of ordinates denotes a z coordinate and an axis of abscissae denotes time in FIG. 10. Furthermore, components the same as those illustrated in FIG. 7 are denoted by reference numerals the same as those of FIG. 7. A dotted line 700 indicates a touch threshold value given as an initial value ($\gamma>0$). In the modification, the release threshold value δ ($\delta>0$) which is fixed and set during a movement of the operation object in the touch state coincides with the threshold value γ. Accordingly, in the modification, the dotted line 700 also indicates the release threshold value set during a movement of the operation object in the touch state.

First, a time point when the distance between the fingertip 500 in the non-touch state and the target surface 101 is smaller than the touch threshold value γ (the dotted line 700) and the fingertip 500 enters the touch state is illustrated in FIG. 10 as a touch detection time point 701. In this modification, obtainment of the touch duration time and the movement distance of the fingertip is started at the touch detection time point 701. After the touch detection time point 701, every time a range image is input in accordance with a frame rate, a distance between the fingertip 500 and the target surface 101 (a z coordinate) is obtained, and a smallest distance 702 is specified as a first reference value. Thereafter, a value obtained by adding a predetermined value α to the first reference value 702 is determined as the release threshold value for each frame (denoted by a dotted line 704 in FIG. 10). Here, in an operation of moving the fingertip 500 in the touch state in parallel to the target surface (the move operation, for example), if a trajectory 502 of the distance between the fingertip relative and the target surface is unstable, the trajectory 502 may frequently become close to the release threshold value (the dotted line 704) which is dynamically determined or may exceed the release threshold value. If the distance exceeds the release threshold value, the release operation is recognized even if the user intends to continue an input of the move operation.

Therefore, in this modification, the predetermined value δ (the dotted line 700) is determined as the release threshold value at a time point 900 when the touch duration time exceeds a predetermined period of time or the movement distance of the fingertip exceeds a predetermined distance so that false recognition of the release operation is reduced. In this case, in a release operation recognition process using an input image of a next frame, the release operation is recognized at a time point 901 when the distance between the fingertip 500 and the target surface 101 indicated by the trajectory 502 exceeds the release threshold value denoted by the dotted line 700.

As described above, according to this modification, even in the case where an error is included in obtainment of the distance between the operation object and the target surface, a release operation may be recognized at a timing desired by the user. In particular, a release false recognition may be reduced while the operation object is moved in the touch state.

Note that, in the modification described above, a duration time of the touch state and a movement distance of the fingertip are used as a reference for determining use of a fixed release threshold value instead of dynamically determined release threshold value. However, a movement speed of the fingertip or a change of an orientation of a hand may be used as the reference instead. For example, in a case where a movement speed is used as the reference, the release threshold value is fixed at a time point when a movement speed of the operation object in the touch state reaches a predetermined speed. A detection response speed and false detection suppression of the release operation may be controlled by selecting the reference information in addition to a type of operation performed by the user or accuracy of obtainment of a distance of a sensor.

According to the present disclosure, false recognition of an end of a touch input caused in a case where an error is included in a result of detection of a degree of proximity between an operation object and a target surface may be reduced.

The present disclosure may be realized by a process of supplying a program which realizes at least one of the functions of the foregoing embodiment to a system or an apparatus through a network or a storage medium, which may also be referred to more fully as a 'non-transitory computer-readable storage medium', and reading and executing the program using at least one processor and at least one memory included in the system or the apparatus. Alternatively, the present disclosure may be realized by at least one or more circuits (e.g. an application specific integrated circuit (ASIC), or the like, for performing the functions of one or more of the above-described embodiment(s).

The present disclosure is not limited to the foregoing embodiment and various modifications and changes may be made without departing from the sprit and the scope of the present disclosure. Therefore, claims below are attached so as to disclose the scope of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from International Patent Application No. PCT/JP2015/073332, filed Aug. 20, 2015, which is hereby incorporated by reference herein in its entirety.

What is claimed is:

1. An information processing apparatus comprising:
one or more processors configured to function as:
an obtaining unit configured to obtain information indicating a degree of proximity between an operation object and a predetermined surface;
a reference determination unit configured to determine as a reference value, the degree of proximity obtained when the operation object most closely approaches the predetermined surface in transition of the degree of proximity during one touch input to the predetermined surface by the operation object after a start of the one touch input is recognized;
a condition determination unit configured to determine, during the one touch input, that the operation object is moved away from the predetermined surface by a distance larger than a threshold value obtained by adding a predetermined value to the reference value as a condition associated with the degree of proximity for recognizing an end of the one touch input based on the reference value specified by the reference determination unit; and
a recognition unit configured to recognize an end of the one touch input when the degree of proximity indicated by the information obtained by the obtaining unit satisfies the condition determined by the condition determination unit.

2. The information processing apparatus according to claim 1, wherein the information indicating the degree of proximity is a value corresponding to a distance between the operation object and the predetermined surface.

3. The information processing apparatus according to claim 1, wherein the information indicating the degree of proximity is a value corresponding to a magnitude of pressure applied to the predetermined surface by the operation object.

4. The information processing apparatus according to claim 1, wherein the information indicating the degree of proximity is a value corresponding to an amount of change of an electrostatic capacitance generated on the predetermined surface when the operation object approaches the predetermined surface.

5. The information processing apparatus according to claim 1, wherein the information indicating the degree of proximity is a value corresponding to a size of an area in which the operation object is in contact with the predetermined surface.

6. The information processing apparatus according to claim 1, wherein the condition determination unit determines the condition as a condition for recognizing an end of the one touch input for a period of time after a start of the one touch input is recognized and before a period of time in which the one touch input is continued exceeds a predetermined period of time.

7. The information processing apparatus according to claim 1, wherein the condition determination unit determines the condition as a condition for recognizing an end of the one touch input for a period of time after a start of the one touch input to the predetermined surface by the operation object is recognized and before a movement distance of the operation object during the one touch input exceeds a predetermined distance.

8. The information processing apparatus according to claim 1, wherein the condition determination unit determines the condition as a condition for recognizing an end of the one touch input for a period of time after a start of the one touch input to the predetermined surface by the operation object is recognized and before the operation object moves at a predetermined speed.

9. An information processing apparatus comprising:
one or more processors configured to function as:
an obtaining unit configured to obtain information indicating a degree of proximity between an operation object and a predetermined surface;
a reference determination unit configured to determine a first reference value associated with the degree of proximity based on transition of the degree of proximity during one touch input to the predetermined surface by the operation object after a start of the one touch input is recognized;

a condition determination unit configured to determine, during the one touch input a first condition associated with the degree of proximity for recognizing an end of the one touch input based on the first reference value specified by the reference determination unit; and a recognition unit configured to recognize an end of the one touch input when the degree of proximity indicated by the information obtained by the obtaining unit satisfies the first condition determined by the condition determination unit, wherein the reference determination unit is further configured to determine a second reference value associated with the degree of proximity based on the degree of proximity obtained after an end of a previous one touch input to the predetermined surface by the operation input is recognized, the condition determination unit is further configured to determine a second condition associated with the degree of proximity for recognizing a start of a new one touch input based on the second reference value, and the recognition unit further recognizes a start of the new one touch input when the degree of proximity indicated by the information obtained by the obtaining unit satisfies the second condition determined by the condition determination unit.

10. The information processing apparatus according to claim 9, wherein the reference determination unit determines the second reference value based on the degree of proximity obtained when the operation object is separated from the predetermined surface in the transition of the degree of proximity after an end of the previous one touch input to the predetermined surface by the operation object is recognized.

11. The information processing apparatus according to claim 9, wherein the condition determination unit determines a situation that the distance between the operation object and the predetermined surface is smaller than a threshold value obtained by subtracting a predetermined value from the second reference value as the second condition associated with the degree of proximity.

12. The information processing apparatus according to claim 9, wherein the condition determination unit determines the second condition as a condition for recognizing a start of the new one touch input for a period of time after an end of the previous one touch input to the predetermined surface by the operation object is detected and before the distance between the operation object and the predetermined surface exceeds a predetermined distance.

13. A method for controlling an information processing apparatus comprising:

an obtaining step of obtaining information indicating a degree of proximity between an operation object and a predetermined surface;

a specifying step of determining as a reference value, the degree of proximity obtained when the operation object most closely approaches the predetermined surface in transition of the degree of proximity during one touch input to the predetermined surface by the operation object after a start of the one touch input is recognized;

a determining step of determining, during the one touch input, that the operation object is moved away from the predetermined surface by a distance larger than a threshold value obtained by adding a predetermined value to the reference value as a condition associated with the degree of proximity for recognizing an end of the one touch input based on the reference value; and a recognizing step of recognizing an end of the one touch input when the degree of proximity indicated by the information obtained in the obtaining step satisfies the condition determined in the determining step.

14. A non-transitory storage medium that stores a program that causes a computer to function as an information processing apparatus comprising:

an obtaining unit configured to obtain information indicating a degree of proximity between an operation object and a predetermined surface;

a reference determination unit configured to determine as a reference value, the degree of proximity obtained when the operation object most closely approaches the predetermined surface in transition of the degree of proximity during one touch input to the predetermined surface by the operation object after a start of the one touch input is recognized;

a condition determination unit configured to determine, during the one touch input, that the operation object is moved away from the predetermined surface by a distance larger than a threshold value obtained by adding a predetermined value to the reference value as a condition associated with the degree of proximity for recognizing an end of the one touch input based on the reference value specified by the reference determination unit; and a recognition unit configured to recognize an end of the one touch input when the degree of proximity indicated by the information obtained by the obtaining unit satisfies the condition determined by the condition determination unit.

15. A method for controlling an information processing apparatus comprising:

an obtaining step of obtaining information indicating a degree of proximity between an operation object and a predetermined surface;

a specifying step of determining a first reference value associated with the degree of proximity based on transition of the degree of proximity during one touch input to the predetermined surface by the operation object after a start of the one touch input is recognized;

a determining step of determining, during the one touch input, a first condition associated with the degree of proximity for recognizing an end of the one touch input based on the first reference value; and a recognizing step of recognizing an end of the one touch input when the degree of proximity indicated by the information obtained in the obtaining step satisfies the first condition determined in the determining step, wherein the specifying step determines a second reference value associated with the degree of proximity based on the degree of proximity obtained after an end of a previous one touch input to the predetermined surface by the operation input is recognized, the determining step determines a second condition associated with the degree of proximity for recognizing a start of a new one touch input based on the second reference value, and the recognizing step recognizes a start of the new one touch input when the degree of proximity indicated by the information obtained by the obtaining unit satisfies the second condition determined by the determining step.

16. A non-transitory storage medium that stores a program that causes a computer to function as an information processing apparatus comprising:
- an obtaining unit configured to obtain information indicating a degree of proximity between an operation object and a predetermined surface;
- a reference determination unit configured to determine a first reference value associated with the degree of proximity based on transition of the degree of proximity during one touch input to the predetermined surface by the operation object after a start of the one touch input is recognized;
- a condition determination unit configured to determine, during the one touch input a first condition associated with the degree of proximity for recognizing an end of the one touch input based on the first reference value specified by the reference determination unit; and
- a recognition unit configured to recognize an end of the one touch input when the degree of proximity indicated by the information obtained by the obtaining unit satisfies the first condition determined by the condition determination unit, wherein the reference determination unit is further configured to determine a second reference value associated with the degree of proximity based on the degree of proximity obtained after an end of a previous one touch input to the predetermined surface by the operation input is recognized, the condition determination unit is further configured to determine a second condition associated with the degree of proximity for recognizing a start of a new one touch input based on the second reference value, and the recognition unit further recognizes a start of the new one touch input when the degree of proximity indicated by the information obtained by the obtaining unit satisfies the second condition determined by the condition determination unit.

* * * * *